Sept. 29, 1931.  F. WANDER, JR  1,825,493
ROTARY WING FOR AEROPLANES
Filed Aug. 26, 1930
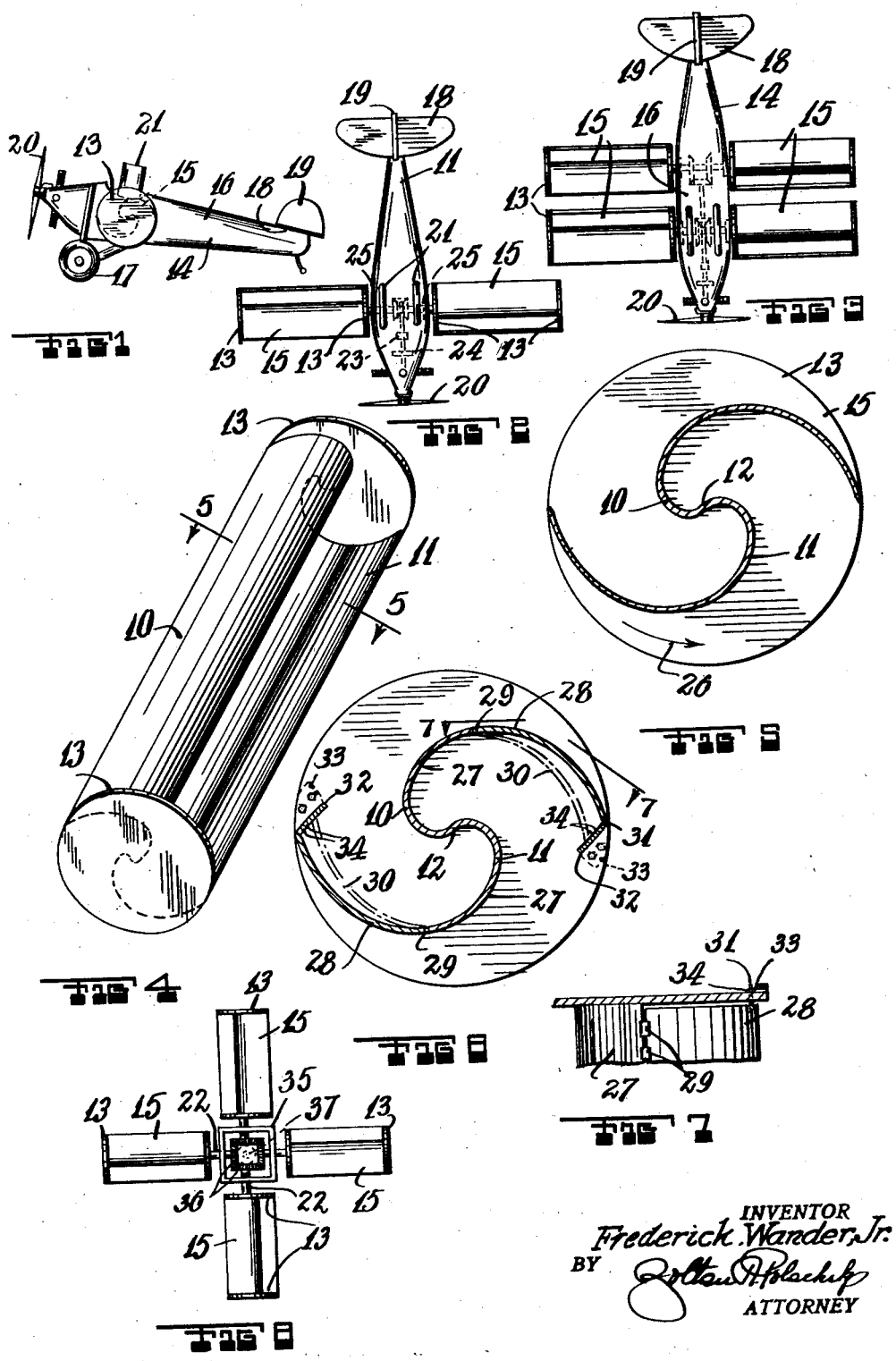

Patented Sept. 29, 1931

1,825,493

UNITED STATES PATENT OFFICE

FREDERICK WANDER, JR., OF NEW YORK, N. Y.

ROTARY WING FOR AEROPLANES

Application filed August 26, 1930. Serial No. 477,862.

This invention relates to new and useful improvements in a rotary wing for airplanes.

The invention has for an object the provision of a device of the class mentioned which is of simple durable construction, dependable in use and efficient in action, and which can be manufactured and sold at a reasonable cost.

The invention proposes the provision of a rotating curved longitudinal member of uniform transverse section throughout its length and being in the form of a pair of similar spirals starting at a common point and directed away from the center at 180° from each other, and each spiral being substantially three-quarters of a turn so that upon being revolved to cause different pressures above and below and to lift an airplane provided with one or more of such members.

The invention also proposes a means for adjusting the positions of the outer halves of said spiral for changing the action of said wing.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:—

Fig. 1 is a side elevational view of an airplane provided with wings according to this invention.

Fig. 2 is a plan view of Fig. 1.

Fig. 3 is a plan view similar to Fig. 2, but showing another airplane which is provided with wings according to this invention but arranged in tandem.

Fig. 4 is a perspective view of a rotary wing per se, constructed according to this invention.

Fig. 5 is a transverse sectional view taken on the line 5—5 of Fig. 4.

Fig. 6 is a view similar to Fig. 5, but illustrating a modification.

Fig. 7 is a fragmentary sectional view taken on the line 7—7 of Fig. 6.

Fig. 8 is a plan view of a helicopter rotor formed from wings constructed according to this invention.

The rotary wing for airplanes is indicated on the drawing by numeral 15 and comprises a curved longitudinal member of uniform transverse section throughout its length, said transverse section being clearly shown in Fig. 5 and being substantially in the form of a pair of similar spirals 10 and 11 starting at a common point 12 and directed away from the point at 180° from each other and each spiral being substantially three-quarters of a turn, a pair of discs 13 attached on the ends of said longitudinal member with their centers in line with the common point 12, and means for supporting said discs 13 and longitudinal member for rotation about said common point constituting the axis of the wing.

In Figs. 1 and 2 an airplane 14 has been shown which includes a pair of the wings 15. These wings 15 are used in lieu of the customary flat stationary wings. The airplane 14 is shown to include a body 16, a landing gear 17, an elevator 18 and a rudder 19. The airplane is also of the motor driven propeller type shown with a propeller 20. These various parts were mentioned so that their relation to the new wings 15 may be clearly understood. The wings 15 are arranged on opposite sides of the body 14 and are supported for rotation, as hereinafter further described. On top of the body 14 there are special ailerons 21 for the control of the flying machine in that conventional ailerons cannot be used in conjunction with the wings 15.

These special ailerons comprise vertical flat members which are pivotally mounted on vertical axes so that when parallel and facing sidewards, that is, with their edges directly frontwards they merely cut through the air when the airplane is in flight, but when turned to different angles about the vertical axis they provide aileron action. The means for supporting the wings 15 for rotating about said common point and constituting the axis of the wings comprise shafts 22 projecting from one of the discs 13 and extending into the body 14 of the airplane and rotatively supported. A drive system 23 connects with the shafts 22 and includes a clutch 24 so that rotations of the wings may be controlled. Brakes 25 are also arranged upon the shafts 22 to halt rotations when this is desirable.

In Fig. 3 the airplane 14 has been shown provided with wings 15 arranged in tandem. In all, there are four wings shown, two wings behind each other on one side of the body 14 and another two on the other side. The supporting and operation and construction of these wings are similar to the ones previously described, the only difference being that when working in tandem they produce greater lifting power so that the airplane may carry a larger load.

In Figs. 4 and 5 a detail construction has been shown of one of the wings. An arrow 26 indicates the direction of rotation of the wing. Such direction of rotation will cause the tails of the spirals to slap against the air and produce the unbalanced pressure conditions before referred to. As shown, the tails of the spirals terminate exactly at the periphery of the disc 13.

In the modified form of the device illustrated in Figs. 6 and 7, a means has been shown for adjusting the outer halves or tail ends of the spirals 10 and 11 for changing the action of the wing. This means comprises inner half sections 27 of each of the spirals fixed to the discs 13 and separate from outer half sections 28 which are hingedly connected at 29 to the fixed sections 27. This allows the outer sections 28 to assume various positions, as for example the position indicated by the dot and dash lines 30. Pins 31 project from each of the sides of the movable sections 28 and engage in slots 32 formed in the end discs 13. Plates 33 are bolted onto the end discs 13 and formed with an arcuate side having teeth 34 adapted to engage against the pins 31 and hold the pins in any adjusted position. To change the positions of the sections 28, it is necessary to loosen the plates 33 so that the teeth 34 disengage from the pins 31, and then make proper adjustments thereafter tightening the plate to maintain the new adjustments.

In Fig. 8 a helicopter rotor has been shown formed from rotary wings 15. In all, four such wings have been shown. The helicopter comprises a vertical rotatable hollow shaft 35 shown square in plan view and rotatively supporting the shafts 22 of each of the wings 15. Bevel gears 36 are fixed upon the inner ends of the shafts 22 and mesh with a driver bevel gear 37 upon a vertical shaft so that each of the wings 15 may be rotated while the complete helicopter rotor is turned or also rotated. Of course, the helicopter rotor turns about on a vertical axis, while each of the wings 15 turn about their particular horizontal axes.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention what I claim as new, and desire to secure by United States Letters Patent is:—

1. A rotary wing for airplanes, comprising a curved longitudinal member of uniform transverse section throughout its length, said transverse section being substantially in the form of a pair of similar spirals starting at a common center and directed away from the center at 180° from each other and each spiral being substantially three-quarters of a turn, a pair of discs attached on the ends of said longitudinal member with their centers in line with said common point, means for supporting said discs and longitudinal member for rotating about said common point constituting the axis of said wing, and means for adjusting the positions of the outer halves of said spirals for changing the action of said wing.

2. A rotary wing for airplanes, comprising a curved longitudinal member of uniform transverse section throughout its length, said transverse section being substantially in the form of a pair of similar spirals starting at a common center and directed away from the center at 180° from each other and each spiral being substantially three-quarters of a turn, a pair of discs attached on the ends of said longitudinal member with their centers in line with said common point, means for supporting said discs and longitudinal member for rotating about said common point constituting the axis of said wing, and means for adjusting the positions of the outer halves of said spirals for changing the action of said wing, said means comprising inner half spiral sections fixed upon said discs and outer half spiral sections pivotally connected with the inner half sections, and means for holding said outer sections in various adjusted positions.

3. A rotary wing for airplanes, comprising a curved longitudinal member of uniform transverse section throughout its length, said transverse section being substantially in the form of a pair of similar spirals starting at a common center and directed away from the center at 180° from each other and each spiral being substantially three-quarters of a turn, a pair of discs attached on the ends of said longitudinal member with their centers in line with said common point, means for supporting said discs and longitudinal member for rotating about said common point constituting the axis of said wing, and means for adjusting the positions of the outer halves of said spirals for changing the action of said wing, said means comprising inner half spiral sections fixed upon said discs and outer half spiral sections pivotally connected with the inner half sections, and means for holding said outer sections in various adjusted positions, said means comprising pins projecting from the edges of the movable sections through slots in said discs, and plates with teeth attached on said discs and engaging said pins.

4. A rotary wing for airplanes, comprising a curved longitudinal member of uniform transverse section throughout its length, said transverse section being substantially in the form of a pair of similar spirals starting at a common center and directed away from the center at 180° from each other and each spiral being substantially three-quarters of a turn, a pair of discs attached on the ends of said longitudinal member with their centers in line with said common point, means for supporting said disc and longitudinal member for rotating about said common point constituting the axis of said wing, and means for adjusting the position of the outer halves of said spirals for changing the action of said wing, said means comprising inner half spiral sections fixed upon said discs and outer half spiral sections pivotally connected with the inner half sections, and means for holding said outer sections in various adjusted positions, comprising projections from the edges of the movable sections engaging in slots, and means for clamping said projections in fixed adjusted positions in said slots.

5. A rotary wing for airplanes, comprising a curved longitudinal member of uniform transverse section throughout its length, said transverse section being substantially in the form of a pair of similar spirals starting at a common center and directed away from the center at 180° from each other and each spiral being substantially three-quarters of a turn, a pair of discs attached on the ends of said longitudinal member with their centers in line with said common point, means for supporting said disc and longitudinal member for rotating about said common point constituting the axis of said wing, and means for adjusting the position of the outer halves of said spirals for changing the action of said wing, said means comprising inner half spiral sections fixed upon said discs and outer half spiral sections pivotally connected with the inner half sections, and means for holding said outer sections in various adjusted positions, comprising projections from the edges of the movable sections engaging in slots, and means for clamping said projections in fixed adjusted positions in said slots, comprising plates formed with means for engaging said projections, and means for attaching the plates to the said discs.

6. A rotary wing for airplanes, comprising a curved longitudinal member of uniform transverse section throughout its length, said transverse section being substantially in the form of a pair of similar spirals starting at a common center and directed away from the center at 180° from each other and each spiral being substantially three-quarters of a turn, a pair of discs attached on the ends of said longitudinal member with their centers in line with said common point, means for supporting said disc and longitudinal member for rotating about said common point constituting the axis of said wing, and means for adjusting the position of the outer halves of said spirals for changing the action of said wing, said means comprising inner half spiral sections fixed upon said discs and outer half spiral sections pivotally connected with the inner half sections, and means for holding said outer sections in various adjusted positions, comprising projections from the edges of the movable sections engaging in slots, and means for clamping said projections in fixed adjusted positions in said slots, comprising plates formed with means for engaging said projections, and means for attaching the plates to the said discs, comprising bolts engaging through both plates and discs.

In testimony whereof I have affixed my signature.

FREDERICK WANDER, Jr.